United States Patent Office 2,873,305
Patented Feb. 10, 1959

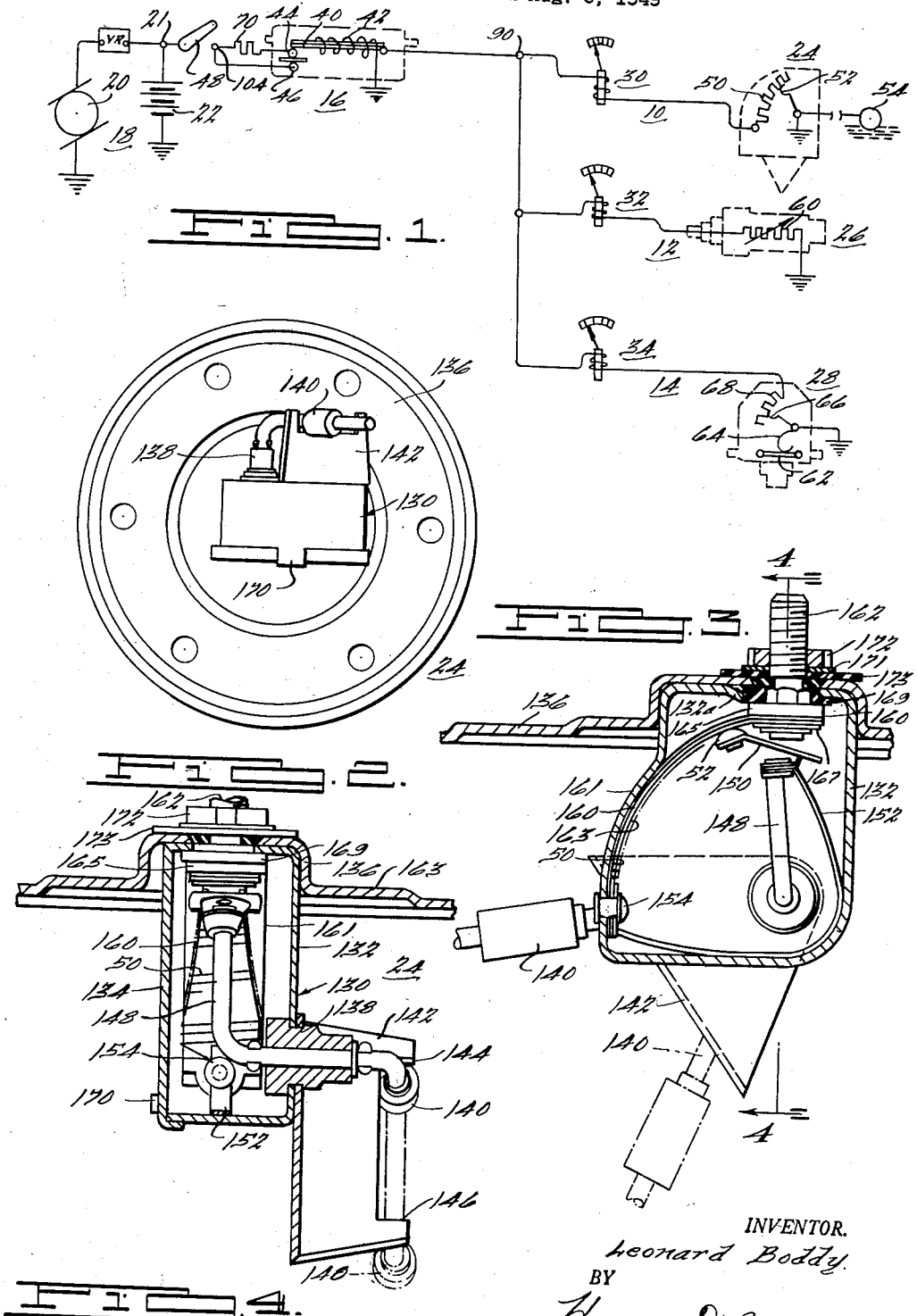

2,873,305
LIQUID LEVEL INDICATING DEVICE

Leonard Boddy, Ann Arbor, Mich., assignor to King-Seeley Corporation, Ann Arbor, Mich., a corporation of Michigan Original application August 5, 1949, Serial No. 108,733, now Patent No. 2,835,885, dated May 20, 1958. Divided and this application December 20, 1954, Serial No. 476,504

1 Claim. (Cl. 174—52)

This invention relates to current modulating devices and more particularly to variable-impedance, fluid-level-measuring devices.

The object of this invention is to improve, simplify and reduce the cost of manufacture and maintenance of fluid-level measuring devices.

A feature of this invention is an improved means responsive to variations in the level of a fluid for varying the value of a resistance.

Another feature of this invention is a movable lever carrying a resiliently mounted electrical contact adapted to engage and control the resistance of a resistive element.

Another feature of this invention is an improved means for limiting the motion of a lever controlling the value of a variable resistor.

A further feature of this invention is an improved means for insulating an electrical terminal from a casing carrying electrical components.

The manner of accomplishment of the foregoing object, the nature of the foregoing features, and other objects and features of the invention, may be perceived from the following detailed description of an embodiment of the invention when read with reference to the accompanying drawings in which:

Figure 1 is a diagrammatic view of a gauging system with which the current modulating device constituting this invention may be embodied;

Fig. 2 is a view in bottom plan of an improved rheostatic element adapted to respond to the level of a fluid, embodying the principles of the invention;

Fig. 3 is a view in vertical section of the structure of Fig. 2; and

Fig. 4 is a view in vertical section, taken substantially along the line 4—4 of Fig. 3.

This application is a division of my application Serial No. 108,773, filed August 5, 1949, now Patent No. 2,835,885, granted May 20, 1958, relating to Thermal Responsive Gauging System. Details of the operation of the gauging circuit, of which the device constructed in accordance with the principles of the present invention may be a part, are presented in the aforesaid application and reference may be had thereto to supplement the general description hereinafter presented.

Considering first the system of Fig. 1, in general, the illustrative gauging circuits 10, 12 and 14 are connected in parallel with each other and receive electric energy, at a voltage regulated by regulator 16, from a source 18. The source 18 may be of various types, but when the present improvements are used in connection with automotive vehicles, source 18 may, for example, comprise a usual engine driven generator 20 and a battery 22. In line with conventional automotive practice, a voltage regulator VR is interposed between the generator and the battery and, as will be understood, serves to maintain the voltage of the latter between limits which are acceptable for many of the vehicle requirements. In practice, these limits are not close enough for satisfactory operation of desirably simple electric gauges.

The regulator 16 receives the noticeably variable output of the source 18 and delivers pulsating energy to the gauging circuits, the effective voltage of the regulator being substantially independent of variations in the voltage of the source. Under these conditions, it will be appreciated that the individual gauging circuits can utilize simple rheostatic elements 24, 26, and 28 which, in response to liquid level, engine temperature, oil pressure, or other physical condition, serve to vary the resistance of the individual gauge circuits and thereby control the current through, and consequently the positions of, the individual gauges 30, 32, and 34.

As diagrammatically shown in Figure 1, the regulator 16 comprises a thermally responsive tri-metallic element 40, which carries a heater winding 42. One terminal of winding 42 is grounded as indicated, and the other terminal thereof is electrically connected to the element 40. In this instance the current modulating means comprises a pair of contacts 44 and 46 and a shunt resistor 70. The element 40 carries the movable contact 44, which normally engages the fixed contact 46. Contact 46 in turn is connected to the source 18 through a control switch 48 which may, for example, be controlled concurrently with or be a part of the ignition switch of the associated vehicle.

With this relation, it will be appreciated that closure of switch 48 completes the circuit from the source 18, through contacts 46—44, the body of the element 40 and the heater winding 42 to ground. Completion of this circuit supplies heat to the element 40 and causes its temperature to rise. As is discussed in more detail below, the electrical resistance of the element 40 is so low that, for all practical purposes, all of the heating effect can be considered as being derived from the winding 42. With this relation, element 40 can also serve as a conductor of the gauging and heating currents.

Upon being heated, the element 40 warps and separates the contacts 44 and 46, interrupting the just traced circuit and also reducing the heating effect to a value determined by shunt resistor 70. The reduction in heating effect enables the element 40 to cool and restore the contacts 44—46 to closed condition. So long, accordingly, as switch 48 remains closed, contacts 44—46 are periodically opened and closed and the heating current is correspondingly modulated. Consequently, the element 40 acquires a temperature just high enough to hold the contacts 44—46 in a condition of incipient closing and opening. Consequently, neglecting ambient effects, regulator 16 acts to receive from the source 18 an amount of electric energy, in pulsating form, which has a substantially uniform heating value. On this basis, and since, over any period of time, the wattage input to the regulator heater ($E^2/r$) is at a constant rate, it is evident that the regulator 16 breaks up the energy supplied by source 18 into a succession of pulses having an effective voltage which is independent of variations in the voltage of the source 18.

The voltage impressed across winding 42, between terminal 44 and ground is, of course, equal to the voltage impressed upon the individual gauging circuits 10, 12, and 14. These circuits, therefore, are supplied from the source 18 with pulsating energy at an effective voltage which is substantially independent of variations in the voltage of the source 18. Regulator 16 thus effectively serves as a regulator of the voltage impressed across the gauging circuits, and currents drawn by the individual gauging circuits are thus independent of variations in voltage of the source 18.

The liquid level unit 24 in Figure 1 is diagrammatically shown as comprising a resistor 50 disposed to be variably engaged by a grounded contact 52 which in turn is suitably connected to a float 54. As the liquid level rises, the amount of resistor 50 included in gauging circuit 10 is correspondingly reduced, which action, of course, increases the current drawn by the corresponding indicator 30. This current increase raises the temperature of its associated bimetal and causes a corresponding travel of the gauge needle. A reverse action is, of course, caused by the lowering of the liquid level.

Referring now to Figures 2, 3 and 4, a preferred construction of liquid level unit 24 is illustrated as comprising a main casing portion 130 composed of a cup-shaped stamping 132 and a cover 134 therefor. Casing 130 is carried by a mounting plate 136, which is adapted to be permanently secured in place on the associated liquid container such as the gas tank of an automobile.

The wall of the cup-shaped casing member 132 is apertured to receive a bearing element 138, which rotatably journals a crank 140, the exposed portion of which is adapted for connection in any suitable manner, to a float (not shown). A triangular shaped stop member 142 is also carried by the casing portion 132, and is provided with shoulders 144 and 146, which act as limits to the up and down swinging movements of the arm 140. The parts are shown in the nearly full position, the low level position being indicated by dotted lines.

The inner crank arm 148 carries the previously identified contact 52, which is mounted at the free end of a spring-like supporting member 150. Member 150 in turn is riveted or otherwise permanently secured to the crank arm 148. Contact 52 is electrically grounded by a flexible grounding strip 152, the free end whereof is secured to the wall of the casing member 132 by a rivet 154. Rivet 154 also serves as a mounting for one end of a resistor mounting member 160 of arcuate form. The other end of mounting member 160 is secured to the terminal stud 162. Mounting member 160 carries a spirally wound piece of resistance wire one end of which may, if desired, be grounded to the casing by rivet 154 and the other end whereof is electrically connected to the stud 162.

More particularly, mounting member 160 comprises a Bakelite or other insulating backing member 161 and an inner winding carrying member 163. The upper ends of elements 161—163 are apertured to fit over the reduced inner end of the stud 162. This inner end of stud 162 is headed over, clamping elements 161—163, as well as the end of resistor 50, between conductive washers 165 and 167, thus completing the mounting for the resistor 50 and also electrically connecting it to the stud 162.

The aligned apertures in the casing member 130 and the mounting plate 136 receive, respectively, insulators 169 and 171. The outer periphery of insulator 169 is noncircular, and a nonrotative connection between it and casing member 132 is afforded by striking one or more tongues 132a from the body of the latter. The inner periphery of insulator 169 is polygonal and receives the correspondingly shaped portion of stud 162. Insulator 171 may be and preferably is formed of a synthetic material which normally forms a tight seal around the stud, but which tends to swell and increase the effectiveness of the seal in the event gasoline or similar liquids come in contact with it. Externally of the casing an insulating washer 173 is interposed between mounting plate 136 and the clamping nut 172 which is threaded onto terminal 162. With this relation, it will be appreciated that terminal 162 is electrically connected to one end of resistor 50 but that these elements are insulated from the housing except through contact 52. These elements may be additionally electrically connected to the housing through rivet 154, in the event the lower end of the resistor 50 is connected to the latter.

The mounting plate 136, of course, has a fluid-tight connection with the liquid container, but the balance of the liquid level unit is not required to be liquid-tight. Consequently, no provision need be made for sealing the crank bearing.

The rheostatic and crank elements of the liquid level unit are, of course, initially assembled within the casing portion 132, and this subassembly is connected to the mounting plate 136 by threading nut 172 onto the terminal stud 162. Before application of the cover 134, the unit is tested and adjusted so as to insure that for given float positions, contact 52 engages resistor 50 at the proper point. These adjustments are readily made by bending the inner crank arm 148. The assembly is completed by applying the cover 134, which is held in place by bending over one or more ears 170 provided on the case.

It will be noted that the float arm 140 may be subject to rapidly fluctuating positions in operation which movements are, of course, communicated to the associated rheostat contact 52. Thus, the value of resistor 50 included in the liquid level unit circuit varies more or less continuously and at random, but has an average position which is a measure of the height of the liquid in the container. These rapidly fluctuating and random variations in the value of resistor 50 have no noticeable effect upon the position of the needle of the corresponding indicator 30, in view of the thermal lag embodied in the latter.

While it will be apparent that the embodiment of the invention herein disclosed is well calculated to fulfill the objects above stated, it will be appreciated that the invention is susceptible to modification, variation and change without departing from the proper scope or fair meaning of the subjoined claim.

What is claimed is:

In a device for modulating electrical energy in accordance with the fuel level in a fuel tank having an aperture therein, a generally cup-shaped casing having an aperture therein, electrical energy modulating means within and supported by said casing, a mounting plate having a central cavity defining a plurality of wall portions and adapted to be secured to the fuel tank over the aperture therein, a threaded stud electrically connected to said means and supported by said mounting plate, a nut threadedly engaging said stud for securing said stud to said mounting plate, insulating means disposed between said nut and said mounting plate for insulating said nut from said mounting plate, an insulating washer engaging the aperture in said casing and said stud and insulating said stud from said casing, means preventing rotation of said washer relative to said casing, means preventing rotation of said stud relative to said washer, means including said stud for securing said casing to and in direct mechanical and electrical engagement with said mounting plate, a portion of said casing seating within the central cavity in said mounting plate and lying above the level of the aperture in the fuel tank, means including said wall portions for fixing said casing in position relative to said mounting plate, cover plate means cooperating with said casing to enclose said electrical energy modulating means, a portion of said cover plate means being disposed between said casing and one of said wall portions, and means for detachably securing said cover plate means to said casing, said cover plate being removable from said casing while said casing is secured to said mounting plate.

References Cited in the file of this patent

UNITED STATES PATENTS

| | | |
|---|---|---|
| 1,753,917 | Cheney | Apr. 8, 1930 |
| 1,902,933 | Zubaty | Mar. 28, 1933 |
| 2,145,744 | Whitney | Jan. 31, 1939 |
| 2,266,298 | Bacon | Dec. 16, 1941 |
| 2,388,054 | Hartzell | Oct. 30, 1945 |
| 2,423,603 | McCandless | July 8, 1947 |

FOREIGN PATENTS

| | | |
|---|---|---|
| 100,118 | Sweden | Oct. 29, 1940 |